United States Patent [19]

Goto et al.

[11] 4,415,643

[45] Nov. 15, 1983

[54] PROCESS FOR PREPARING PHOTOCONDUCTIVE CADMIUM SULFIDE

[75] Inventors: Koji Goto, Kawasaki; Isamu Kajita, Kanagawa; Ichiro Nomura; Hirokuni Kawashima, both of Tokyo, all of Japan

[73] Assignee: Canon Kabushiki Kaisha, Tokyo, Japan

[21] Appl. No.: 296,979

[22] Filed: Aug. 27, 1981

[30] Foreign Application Priority Data

Sep. 3, 1980 [JP] Japan ................................. 55-122183
Sep. 10, 1980 [JP] Japan ................................. 55-125509

[51] Int. Cl.³ ............................................. G03G 5/08
[52] U.S. Cl. ....................................... 430/94; 430/136
[58] Field of Search .................. 430/127, 130, 94, 136

[56] References Cited

U.S. PATENT DOCUMENTS 4,090,983  5/1978  Akaoka ................................. 430/94
4,298,670  11/1981  Murai et al. .......................... 430/94

Primary Examiner—John E. Kittle
Assistant Examiner—John L. Goodrow
Attorney, Agent, or Firm—Fitzpatrick, Cella, Harper & Scinto

[57] ABSTRACT

A process for preparing photoconductive cadmium sulfide comprising steps of forming precipitated cadmium sulfide particles, primarily firing said cadmium sulfide particles, deionizing said cadmium sulfide particles, and secondarily firing said cadmium sulfide particles.

7 Claims, 1 Drawing Figure

PROCESS FOR PREPARING PHOTOCONDUCTIVE CADMIUM SULFIDE

BACKGROUND OF THE INVENTION

1. Field of the Invention

The present invention relates to a process for preparing photoconductive cadmium sulfide. More particularly, the present invention is concerned with an improved process comprising firing cadmium sulfide particles twice, thereby preparing photoconductive cadmium sulfide which is high in the photo-response speed and does not change in the photoconductive characteristic regardless of difference in the storage state therefor.

2. Description of the Prior Art

Photoconductive cadmium sulfide (CdS) is used typically as a photosensitive material for electrophotography. In the most general method of preparing it, hydrogen sulfide is caused to act on a water-soluble cadmium salt such as cadmium sulfate, cadmium chloride and the like to precipitate cadmium sulfide particles, which are then fired at a high temperature in order to dope the particles with an activator. More particularly, the cadmium sulfide particles are mixed with $CuCl_2$, $CuSO_4$ or the like as an activator and a halide such as $CdCl_2$, $ZnCl_2$ or the like as a flux, and fired to dope the particles with Cu, Cl and the like, thereby obtaining photoconductive cadmium sulfide. In an alternative method, a water-soluble cadmium salt is previously mixed with an acceptor and donor in the form of $CuSO_4$, HCl and the like, and hydrogen sulfide gas is then introduced into the mixture to deposit cadmium sulfide particles, which already contain Cu and the like as the acceptor and Cl and the like as the donor. In this case, the cadmium sulfide particles can be doped sufficiently with the donor and acceptor impurities in the subsequent firing step even when the particles are fired in the absence of a flux.

However, in either method, the impurities remain in the vicinity of the surface of the precipitated CdS particles. The impurities cannot be removed by simple washing with water. In the former method, the unreacted starting material such as for example $CdSO_4$ remains in the CdS particles. In the latter method, besides $CdSO_4$, excessive Cl, Cu and the like which are not doped into the CdS particles in the firing step remain in the surface of the particles. These impurities remaining in the vicinity of the CdS surface cause occurrence of the surface defect of the CdS in the firing step. The surface defect becomes the trap level of the photo-carrier, and therefore, the photo-memory of the CdS is increased, that is, the photo-response speed of the CdS is deteriorated. When a photosensitive member using such a CdS is applied to a high speed copying machine, the electrostatic contrast between the light and dark portions becomes insufficient. In such a case that a photosensitive member is prepared by using the CdS particles, the resistance of the photoconductive layer changes and a difference is produced in the photodecay characteristic depending upon the storage conditions for the photosensitve member, that is, whether the photosensitive member is irradiated with light or not. If the electrophotographic property of the photoconductive layer considerably changes depending upon the difference in the storage conditions, it becomes impossible to form stable images. More particularly, the quality of the image which is formed by using a photosensitive member which has been left at the dark place becomes different from that of the image formed by using the photosensitive member which has been left at the light place. For example, the quality of the image obtained when the copying operation starts with the copying machine which is not operated for a considerably long period of time becomes different from that of the image which is obtained, successively after a good many of copies are made with the copying machine in a short time, by carrying out the copying operation with the same copying machine. Therefore, it becomes impossible to form images with stable image quality.

The copying speed becomes higher as the electrophotographic technique is improved. If the photodecay of the photosensitive member is slow, influence of the light irradiation applied in the first cycle of the image forming process inadvantageously remains when the second cycle of the image forming process is carried out. Such light irradiation includes, for example, imagewise exposure, whole surface exposure and pre-exposure conducted prior to the charging step in order to eliminate the electrostatic image formed in the last image forming process.

Further, some of the impurities depositing on the vicinity of the surface of the CdS particles remain there even after the firing of the particles. The photosensitive member produced by using such a CdS provides only electrostatic images having remarkably low electrostatic contrast between the light and dark portions when such photosensitive member is placed under the conditions of high temperature and high humidity, which is due to synergetic function of the hygroscopicity of the impurities and the electroconductivity increased by the moisture absorption. Therefore, formation of images becomes difficult.

The foregoing description is made with reference to CdS for use in an electrophotographic photosensitive member. Also when CdS is used for other applications, for example an element of an exposure meter and photovoltaic element, it is required to have little photo-memory and be excellent in humidity resistance and durability.

SUMMARY OF THE INVENTION

It is an object of the present invention to provide a process for preparing photoconductive cadmium sulfide with little photo-memory.

It is another object of the present invention to provide a process for preparing photoconductive cadmium sulfide which is excellent in the humidity resistance.

It is a further object of the present invention to provide a process for preparing photoconductive cadmium sulfide which is excellent in the durability.

It is still another object of the present invention to provide a process for preparing photoconductive cadmium sulfide which exhibits excellent stability for image quality in the continuous copying operation.

According to the present invention, there is provided a process for preparing photoconductive cadmium sulfide comprising steps of forming precipitated cadmium sulfide particles, primarily firing the cadmium sulfide particles, deionizing the cadmium sulfide particles, and secondarily firing the cadmium sulfide particles.

BRIEF DESCRIPTION OF THE DRAWING

In the accompanying drawing, the single FIGURE schematically shows an apparatus for measuring the photosensitive property of a photosensitive member.

DESCRIPTION OF THE PREFERRED EMBODIMENTS

Figure 1:
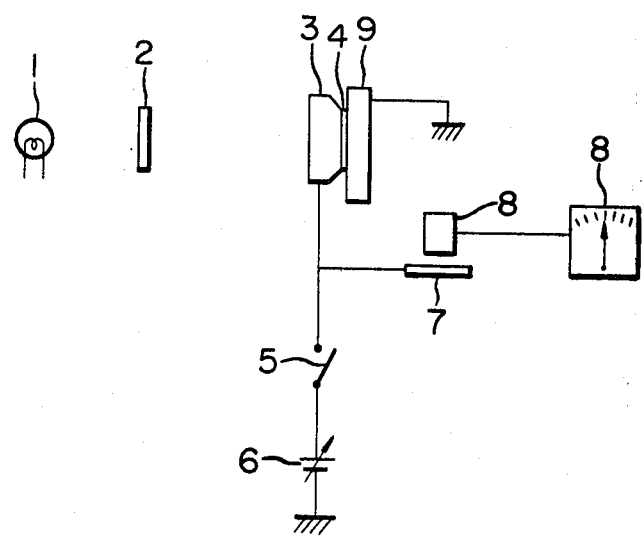

The process for preparing CdS according to the present invention is characterized in that CdS particles which are previously subjected to usual firing step (primary firing step) are deionized to remove impurities depositing on the surface of the CdS particles, and the thus treated particles are again fired (secondary firing step). The deionization may be carried out by various known methods. A typical way to perform the deionization is to use an ion exchange resin. It is particularly preferred to wash the CdS particles with water under such a state that the particles and ion exchange resin coexist in water. In this case, an anion exchange resin and cation exchange resin are used preferably in combination, but an anion exchange resin alone may be used.

The primary firing step is carried out for the purpose of diffusing impurities into the CdS particles and releasing excessive matters, e.g. $SO_4$, Cl and S, depositing on the surface of the CdS particles. After the primary firing the impurities remaining in the vicinity of the CdS surface are removed by the deionization. Thereafter, the CdS particles are again fired, thereby attaining the object of the invention.

The primary firing is carried out preferably at 400°–600° C., particularly at 400°–550° C. The secondary firing is performed usually at a temperature of 350° C. or above, particularly at 450°–550° C. Further, it is more effective to carry out additional deionization subsequently to the secondary firing.

The CdS prepared by the present invention has little photo-memory. For example, the CdS particles are dispersed in a high molecular binder for electrophotography, and the resulting dispersion is coated onto a substrate to form a photoconductive layer, and further if necessary, an insulating layer is provided on the photoconductive layer to prepare a photosensitive plate. The photosensitive plate is applied to a high speed copying machine so that high electrostatic contrast can be obtained which is sufficient for electrophotography. Further, the photosensitive member using CdS of the present invention can produce images of stable, high contrast even under the conditions of high temperature and high humidity.

In order to obtain cadmium sulfide (CdS) which is excellent in the "rising" characteristic, it is effective to make the temperature for the secondary firing higher than that for the primary firing. The "rising" characteristics is related to the stability of images which are formed by intermittently using a photosensitive member. For example, in such a case that after a thousand (1000) copies are continuously made, the photosensitive member is allowed to stand for several hours and the copying operation is again started, if the quality (mainly, image contrast) of the image formed upon restart of the copying operation is the same as that of the image obtained when some copies are continuously made after restart of the copying operation, the "rising" characteristic can be said to be good. On the contrary, the larger the difference in the image quality between the former image and latter image, the worse the "rising" characteristic. In other words, the fewer the number of times for the copying operation after restart thereof required to attain the desired stational image quality (mainly image contrast), the better the "rising" characteristic.

In general, it is preferable to control the temperature for the secondary firing so as to be higher than that for the primary temperature by 30° C. or above. When cadmium sulfide with excellent "rising" characteristic is obtained, it is preferable to carry out the primary firing at a temperature ranging from 400° to 450° C. and perform the secondary firing at a temperature of 450°–550° C.

Now, the invention will be explained more fully by the following examples.

EXAMPLE 1

Cadmium sulfide particles, which already contained copper and chlorine as impurities at the time of precipitating the particles, were charged into a quartz tube, fired in the air at 450° C. for 60 minutes and then allowed to cool. The cadmium sulfide particles was sufficiently washed with pure water. Thereafter, to an aqueous solution containing the cadmium sulfide was added cation exchange resin (trade name: SK-1B(H), supplied by Mitsubishi Chemical Industries, Ltd.) and anion exchange resin (trade name: SA-10A(OH), supplied by Mitsubishi Chemical Industries, Ltd.) in respective amounts of 50 cc per 200 g of the cadmium sulfide. The mixture was stirred for 30 minutes. The cadmium sulfide particles were then separated from the ion exchange resin, filtered and dried overnight at 60° C.

The cadmium sulfide thus treated was again charged into a quartz tube and fired in the air at 450° C. for 60 minutes. After the cadmium sulfide was allowed to cool, it was washed in the same manner as mentioned above, separated from the ion exchange resin, filtered and dried overnight at 60° C.

The obtained cadmium sulfide was sufficiently mixed with a binder resin composed of vinyl chloride-vinyl acetate copolymer. The mixture was coated onto an aluminum substrate having a thickness of 50$\mu$ to form a layer of 40$\mu$ in thickness. A polyester film of 25$\mu$ in thickness was further allowed to adhere onto the layer. Thus, a three layer type photosensitive member for electrophotography was obtained.

EXAMPLE 2

A photosensitive member was prepared in accordance with the same procedure as that described in Example 1 except that the first firing was performed under the conditions of 500° C. and 60 minutes instead of 450° C. and 60 minutes, and the second firing was carried out at 480° C. for 60 minutes instead of 450° C. and 60 minutes.

COMPARATIVE EXAMPLE

In the procedure described in Example 1, the first firing, washing with water, deionization using the ion exchange resin and drying (60° C.) were repeated to prepare cadmium sulfide. After the cadmium sulfide was sufficiently mixed with a binder resin composed of a vinyl chloride-vinyl acetate copolymer, the resulting mixture was coated onto an aluminum substrate of 50$\mu$ in thickness to form a layer of 40$\mu$ in thickness. A polyester film of 25$\mu$ in thickness was further allowed to adhere onto the surface of such layer to thereby obtain a photosensitive member.

The photosensitive characteristics of the photosensitive members prepared in Examples 1 and 2 and Comparative Example were measured by means of an apparatus as illustrated in FIG. 1 in accordance with the following manner.

The surface of the insulating layer of the photosensitive member 9 was brought into pressure contact with a glass plate 3 provided with a transparent electrode 4, which is connected to a high voltage DC power source 6 through a relay switch 5. The relay switch 5 is closed for 0.2 seconds to apply a high voltage (Va) to the photosensitive member, and then the switch was opened to allow the photosensitive member to stand for 0.2 seconds. Thereafter, the photosensitive member was irradiated with light for 0.2 seconds. The change in the surface voltage of the photosensitive member at that time was measured by means of a metal plate 7 lying under the same voltage as that of the surface of the photosensitive member and a surface electrometer 8. The voltage applied to the photoconductive layer of the photosensitive member prior to the irradiation, which is denoted by Vp, is calculated.

Further, as pre-exposure, the photosensitive member was irradiated with white light from a halogen lamp for 0.2 seconds by controlling a shutter 2. After leaving the photosensitive member alone for 0.2 seconds, a high voltage Va was applied thereto, and it is then allowed to stand for 0.2 seconds. Thereafter, the photosensitive member was again irradiated with light for 0.2 seconds. The change in the voltage at that time was measured. The voltage applied to the photoconductive layer prior to the second irradiation, which is denoted by Vp', was calculated.

Vp and Vp' when Va was −2000 V, and Vp when Va was +2000 V were measured. The speed of the photodecay regarding the pre-exposure was evaluated from the value of (Vp−Vp') when Va was −2000 V.

In accordance with the procedure as described above, tests were conducted with the photosensitive members of Examples 1 and 2 allowed to stand under irradiation with light (referred to as "sample in light") and those stored in the dark place (referred to as "sample in dark"). For the sake of comparison, the photosensitive member of Comparative Example was also tested in the same manner. The tests were carried out with Va of −2000 V and +2000 V. When Va was −2000 V, the values for Vp and Vp' were measured. Also when Va was +2000 V, Vp was measured. The values for Vp, Vp' and Vp−Vp' when Va=−2000 V are shown below.

| Sample | | Va = −2000V Vp(−) | Va = +2000V Vp(+) | Va = −2000V Vp −Vp' |
|---|---|---|---|---|
| Example 1 | in light | 1020 | 840 | 80 |
| | in dark | 1020 | 890 | 90 |
| Example 2 | in light | 1000 | 800 | 100 |
| | in dark | 1010 | 830 | 120 |
| Comparative Example | in light | 1010 | 810 | 130 |
| | in dark | 1020 | 840 | 290 |

From the results in the table, it is seen that the photosensitive members of Examples 1 and 2 are smaller than those of Comparative Example in the value of Vp−Vp'. This demonstrates that the photosensitive members of Examples 1 and 2 are less affected by the pre-exposure, in other words that those photosensitive members are higher than the member of Comparative Example in the speed of the photodecay. Further, the results show that the difference in the value of Vp−Vp' between the sample in dark and the sample in light is far small in the photosensitive members of Examples 1 and 2 as compared with in the member of Comparative Example. This demonstrates that the photosensitive members of Examples 1 and 2 are less affected by the difference in the storage conditions (whether they are stored in the light place or in the dark place), in other words they produce images which are scarcely different in the contrast even when they are stored in the different conditions. That is, it is shown that the photosensitive members of Examples 1 and 2 are superior in the formability of stable images.

Further, when the high speed electrophotographic process including pre-exposure, primary charging, AC charging simultaneous with imagewise exposure and whole surface exposure was applied to the photosensitive members of Examples of 1 and 2, high electrostatic contrast was obtained, and images with good quality were obtained. Furthermore, after those photosensitive members were allowed to stand under the circumstances of high temperature and high humidity, i.e. a temperature of 35° C. and humidity of 85% for 24 hours, image formation was again carried out with those photosensitive members. As a result, decrease in the contrast of the light and dark portions as well as deterioration in the sensitivity were not observed, and images with good quality were obtained.

On the other hand, when the above-mentioned electrophotographic process was carried out with the photosensitive member of Comparative Example, the first image obtained at the time of the first copying operation was low in the image density, and the images obtained during repetition of the process did not become stabilized in the density. Further, under circumference of high humidity, decrease in the image density was observed.

EXAMPLE 3

Pure water was added to 70 g of cadmium sulfide particles, 4.6 g of cadmium chloride and 40 mg of cupric chloride, which were sufficiently stirred and uniformly mixed. The slurry was placed in a petri dish and dried at about 200° C. for 15 hours.

The resulting powder was charged into a quartz crucible and fired at each temperature of 380° C., 430° C., 450° C. and 480° C. for one hour. The cadmium sulfide particles were then washed with water for the purpose of removing ions from the surface of the particles. Thereafter, 50 cc of a cation exchange resin and 50 cc of an anion exchange resin were added to a liquid containing the cadmium sulfide particles dispersed therein, and the mixture was stirred at room temperature for 60 minutes to carry out the deionization treatment. The cadmium sulfide particles were separated from the resin, filtered and dried. The cadmium sulfide powder having been subjected to the deionization was further charged into a quartz crucible and again fired at each temperature of 430° C., 450° C., 480° C. and 550° C. for one hour, sufficiently washed with water and deionized to prepare cadmium sulfide for electrophotography.

To 100 g of the cadmium sulfide particles was added a binder resin (vinyl chloride-vinyl acetate copolymer) in an amount of 15% by weight as solid. The mixture was formed into a dispersion by using a roll mill. The dispersion was diluted with methyl ethyl ketone to control its viscosity and then coated onto an aluminum drum to form a layer of 40μ in thickness. After the layer was sufficiently dried, a resin was further coated onto the layer to form an insulating layer of 35μ in thickness. As a result, a photosensitive drum for electrophotography was obtained.

The "rising" characteristic of the photosensitive drum was tested by means of a high speed copying machine. That is, a process including primary charging with positive polarity, charge removal simultaneous with exposure and whole surface exposure was applied to the photosensitive drum to continuously repeat the copying operation for ten thousand (10,000) copies. After the copying operation was discontinued for one hour, it was reopened. The potential of the electrostatic image (corresponding to a portion of the original image wherein the optical density was 0.3) obtained at the time of the first copying operation after reopening the operation was measured, and the potential of the electrostatic image formed at the time of the 50th copying operation after the reopening was also measured. The difference in the potential between the first and 50th electrostatic images is shown in the following table.

| Secondary firing temperature | Primary firing temperature | | | |
|---|---|---|---|---|
| | 380° C. | 430° C. | 450° C. | 480° C. |
| 430° C. | 200V | 180V | 150V | 150V |
| 450° C. | 150V | *90V | 130V | 150V |
| 480° C. | 160V | *40V | *70V | 120V |
| 550° C. | 140V | *40V | *60V | 140V |

In the results of the table, the value for the difference in the potential, for example 200 V appearing in the left and upper portion means that the value as a result of subtracting the value for the potential of the electrostatic image at the time of the first copying operation after the reopening from the value for the potential of the electrostatic image at the 50th copying operation after the reopening is 200 V with respect to the photosensitive drum using cadmium sulfide prepared through the primary firing at 380° C. and the secondary firing at 430° C. This is also applicable to the other values (V). From the results in the table, it is seen that the cadmium sulfide having been treated under the firing temperature conditions marked with "*" is excellent in the "rising" characteristic.

EXAMPLE 4

Cadmium sulfide powder, in which chlorine and copper were previously contained at the time of formation of the cadmium sulfide precipitate, was fired in a quartz crucible at 430° C. for one hour and sufficiently washed with water. To a solution of the cadmium sulfide powder dispersed therein was added 50 cc of a cation exchange resin and 50 cc of an anion exchange resin, and the mixture was then stirred at room temperatures for 60 minutes to perform the deionization. Further, the cadmium sulfide powder was separated from the resin, filtered, dried and again fired in a quartz crucible at 480° C. for one hour. The resulting cadmium sulfide powder was then sufficiently washed with water and deionized to perpare cadmium sulfide particles for electrophotography.

A photosensitive drum was prepared by using the cadmium sulfide particles in the same manner as in Example 3 and tested with respect to the "rising" characteristic by utilizing a high speed copying machine in accordance with the precedure described in Example 3. It was found that the difference in the potential between the first and 50th electrostatic images after the reopening of the copying operation was 40 V and the photosensitive drum was excellent in the "rising" characteristic.

What we claim is:

1. A process for preparing photoconductive cadmium sulfide comprising steps of:
   forming precipitated cadmium sulfide particles,
   primarily firing said cadmium sulfide particles,
   deionizing said cadmium sulfide particles, and
   secondarily firing said cadmium sulfide particles.

2. A process for preparing photoconductive cadmium sulfide according to claim 1, in which the ionization is carried out under the conditions that the cadmium sulfide particles and ion exchange resin coexist.

3. A process for preparing photoconductive cadmium sulfide according to claim 1, in which the secondary firing is carried out at a temperature of 350° C. or above.

4. A process for preparing photoconductive cadmium sulfide according to claim 1, further comprising a step of deionizing the cadmium sulfide particle after completion of the secondary firing.

5. A process for preparing photoconductive cadmium sulfide according to claim 1, in which the secondary firing is carried out at a temperature higher than that for the primary firing.

6. A process for preparing photoconductive cadmium sulfide according to claim 5, in which the secondary firing is carried out at a temperature higher than that for the primary firing by 30° C. or above.

7. Photoconductive cadmium sulfide prepared by the process according to claim 1.

* * * * *